Patented Feb. 21, 1928.

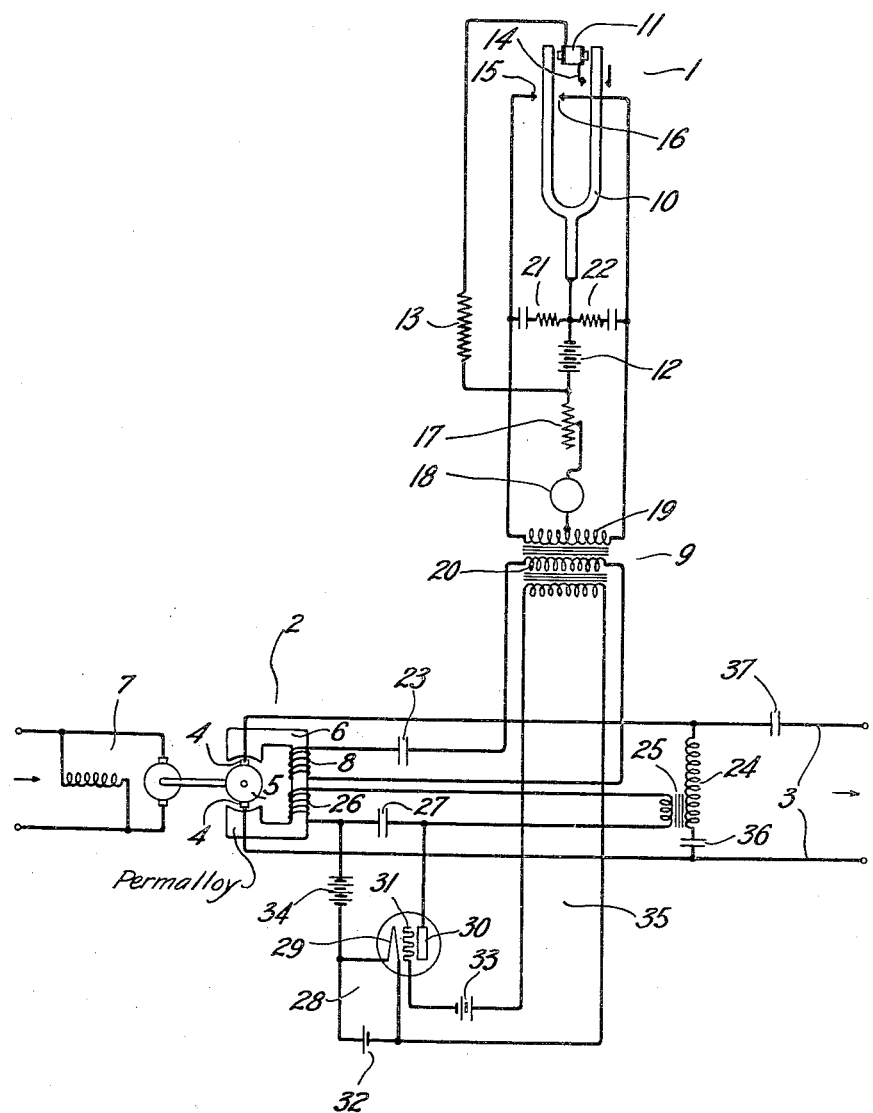

1,660,084

UNITED STATES PATENT OFFICE.

EDMUND R. MORTON, OF NEW YORK, N. Y., ASSIGNOR TO WESTERN ELECTRIC COMPANY, INCORPORATED, OF NEW YORK, N. Y., A CORPORATION OF NEW YORK.

ELECTRICAL CONTROL SYSTEM.

Application filed November 19, 1924. Serial No. 750,856.

This invention relates to electrical control systems and particularly to a method of and means for controlling the frequency of wave generating devices.

It is applicable to the quantitative control of a characteristic of any electrical circuit in which the characteristic is, or may be made to be, a function of the quantity of current flowing in a control circuit, and in the operation of which circuit there occur electrical variations having a frequency proportional to the quantitative measure of a characteristic to be controlled.

One object of the invention is to generate a current in a control system which varies proportionally as a quantitative measure of the characteristic to be controlled as above described.

Another object is to produce in the quantity of a control current a variation which is responsive to a change in relative phase of the electrical variations that initiates a relative change in their frequency. The resulting comparative continuity of cause and effect tends to increase the sensitivity of the control.

In any system for the automatic control of a characteristic whose value is measured by the frequency of an electrical variation the condition of fixity or change of the characteristic is determinable only with reference to some fixed standard of frequency. Further, the variation relative to that standard must initiate the series of steps culminating in the flow of the required quantity of current in the control circuit. It is another object of the invention to use as the frequency standard a source of electrical variations the frequency of which is permanently fixed at a value corresponding to the desired value of the characteristic to be controlled, and to utilize the relative change in phase between the two sets of variations to effect the control stated in the first object.

It is a still further object of the invention to utilize the principles above announced to control the frequency of a wave generation system and particularly to control the frequency of such a system which includes the standard frequency source, itself, as the primary frequency determining element. In a system comprising a primary frequency determining element generating a small amount of power and a regenerative dynamo-electric generator-amplifier means, the principle of the invention is utilized to insure that the system oscillates at the primary frequency instead of at a slightly different frequency determined by the natural conditions of oscillation of such amplifier.

These and other objects may be accomplished in one form of the invention by impressing periodic electrical potentials derived from the feed-back circuit of the generator-amplifier, the circuit to be controlled, on one cold electrode of a three-electrode electric discharge device, and separately impressing on the other cold electrode electrical potentials which are normally of the same frequency but of different phase from those generated by the primary frequency determining source, which may be a tuning fork oscillator.

Under normal conditions of operation an impulse current will flow during the intervals of coincidence of positive potentials on the two cold electrodes. It will be of zero time duration if there is opposition of phase.

Any tendency toward a change of frequency of the system as a whole from that which is characteristic of the primary source, as where the regeneration is so strong that the system tends to oscillate at the frequency determined by the feed-back circuit of the generator-amplifier, results first in a relative change of phase of the two sets of impressed potentials, which further results in a change in the intervals during which there is coincidence of positive potentials on both cold electrodes and which interval progressively increases with successive cycles there will accordingly be a change in the current in the output circuit. This current is caused to flow in the regenerative circuit, and to compensate for the tendency.

The effect is equivalent to that of a change in the natural frequency of the regenerative circuit. The progressive change, per se, in this natural frequency and also the resultant momentary removal of the frequency from the immediate vicinity of its normal value, both tend to discourage any tendency toward such shift of frequency.

A cause and effect condition exists between the change in relative phase and the quantity of resultant control current. The effect has been found to be greater, proportionally, than the cause. The two essential conditions that must exist in all automatic control systems are, therefore, satisfied.

In this invention, the introduction of the time element resulting from the conjoint use of two separate sets of variations, has the incidental effect of varying the time, rather than the amplitude, component of the control current to produce an equivalent change in the quantity of current flowing. This effect contributes to the very great sensitivity and quickness of control that characterizes the operation of the system.

The invention will be more fully understood from the following description read in connection with the accompanying drawing, the single figure of which illustrates a preferred embodiment of the invention.

The wave generating system comprises the primary source 1 and the generator-amplifier 2. The generator-amplifier may be no more nor less than a conventional direct current generator in which alternating, instead of direct, current is supplied to the field to correspondingly generate an alternating current in its armature circuit which reproduces in amplified form, the current which is caused to flow through the field. In this type of amplifier, the frequency of the output current is not affected by the angular velocity at which the rotor is driven, but only by the frequency of the wave impressed on the field, the output current being a reproduction, in magnified form, of that wave. The energy required for accomplishing the amplifying effect is furnished by the rotor driving means, the amount of this energy, hence the degree of the amplification, accordingly being partially dependent on the angular velocity of the rotor.

In the specific system illustrated, the circuit 3 is the output or armature circuit of the generator which is connected to brushes 4, the circuit being completed through armature 5 which includes a commutator (not shown). The magnetic field circuit of the generator comprises the magnetic field structure 6, armature 5, and the air gaps between these elements. The armature is driven by electric motor or other functionally equivalent means 7. The field is excited primarily by a coil 8 which derives its current, through triple winding transformer 9, from primary source 1.

This source may be of any type which is capable of generating current having a sufficiently constant frequency. A tuning fork oscillator has been found to be well adapted for this purpose. In the specific form of tuning fork oscillator illustrated, the prongs of the tuning fork 10 are driven by electromagnet 11 which is excited by current from source 12 through resistance 13, the value of which determines the amplitude of vibration of the fork and accordingly to some extent the operational characteristics of the oscillator. The circuit through this driving circuit is periodically closed by the vibration of the right hand prong of the fork at contact 14. As the fork vibrates, the left hand prong at the furthermost limits of its movement closes circuits at contacts 15 and 16. When contact is made at 15, a circuit is completed which comprises source 12, regulating resistance 17, meter 18, the left hand portion of the primary winding 19 of transformer 9, contact 15 and the left hand prong of the fork. Similarly, when contact is made at 16, a circuit is closed through the right hand portion of the primary winding 19. On account of the periodic alternation of the direction of flow of the current through the primary winding there is generated in the secondary winding 20 a wave which closely approximates a sine wave. Since the field coil 8 derives its current from this coil, the arrangement, therefore, insures that the finally produced current in the armature circuit 3—4—5 is substantially of sine wave form. Circuits 21 and 22, each comprising a condenser and a resistance in series, are connected across the gaps between contacts 15 and 16, respectively, and the fork. They tend to absorb the excess potential developed when the circuit is broken at contacts 15 and 16 to prevent destructive sparking at such contacts. Meter 18 may be used to determine the necessary setting of the resistance 17 and other elements for the efficient operation of the system.

Condenser 23 is inserted in the field coil circuit of the generator-amplifier. It, together with coil 8 and secondary winding 20 insures that said circuit is tuned to substantially the frequency of the current from the primary source, so as to provide the most effective utilization of the current from that source. Since the effectiveness of this circuit depends largely on its sharpness of tuning, it is desirable that it should contain as little resistance as possible. For this reason, the magnetic structure 6 is preferably made up of material now well known by the name of "Permalloy". This alloy may comprise approximately 20% of iron and 80% of nickel which is given a special heat treatment. This material is distinguished by the remarkably low value of magnetizing current required to produce saturation and, accordingly, by its remarkably great permeability. These qualities contribute to the desired end in present system, of producing a very small core loss. As is well known, core loss, since it means an absorption of energy that would otherwise be usefully employed, has an effect equivalent to that of a resistance in the magnetizing circuit of the material in which the loss occurs.

Although the arrangement of the magnetic structure and the magnetizing circuit therefor is disclosed in a very simple and partially diagrammatic form, it is to be understood that the operation of the invention does not depend in any way on any specific arrangement of these elements, which may conform to any of the arrangements used in conventional generator practice. Accordingly, the structure 6 may be laminated or otherwise subdivided to further decrease the core losses.

The amplifying properties of the above described generator-amplifier are increased by feeding back a portion of the output current from shunt circuit 24 through a loosely coupled transformer 25 to the field of the amplifier, that is, from the output to the input circuit of the generator-amplifier. The feed-back energy is impressed on the field through coil 26 which may be wound on the magnetic field structure 6 or be otherwise related to the generator-amplifier to produce an equivalent effect. In order to make most effective use of the feed-back principle, this feed-back (regenerative) circuit is preferably tuned by means of condenser 27 to a frequency as close as is practicable to the generated frequency. The conditions that control this adjustment and a means which makes possible a very close approximation to the generated frequency are pointed out below.

Since the system as a whole, as so far described, has two degrees of freedom, namely, those depending on the primary frequency and the tuning of the regenerative circuit, the system tends to oscillate at each of two frequencies. These two frequencies, as a practical matter of adjustment, must necessarily differ by at least a small amount. The effect of this is that, although the system tends to oscillate most strongly at the primary frequency and does normally so oscillate, nevertheless if the regeneration exceeds a certain critical limit, and if the frequency of this circuit approximates too closely the primary frequency, the tendency for the system to oscillate at the frequency of this circuit may overcome this normal tendency. A shift of frequency may therefore occur, the frequency being subsequently determined by the natural frequency of the regenerative circuit rather than by the primary frequency which is more constant and which is accordingly to be preferred as the frequency which is characteristic of the system.

It is the function of the controlling device 28 to prevent this frequency shift. This device comprises an electric discharge tube having the usual filamentary cathode 29, anode 30 and control electrode 31. Direct current sources 32, 33 and 34, respectively, energize the cathode, provide an initial potential biasing for the control electrode, and supply space current for the device. Electrical variations having the frequency of the primary source are impressed through transformer 9 and circuit 35 on the control electrode and cathode of the discharge device.

Although a source included in a separate circuit may be used for supplying the biasing potential, this potential may equally well be supplied through circuit 35 as illustrated. Electrical variations, having the frequency which is characteristic of the system as a whole, are impressed from the regenerative circuit on the anode and cathode.

The space current for these electrodes, in the specific embodiment illustrated, flows through this impressing circuit and, therefore, through the regenerative circuit. Since this current would incidentally provide a steady uni-directional field current for the generator-amplifier, which would tend to result in a direct current component in the finally generated wave, two condensers 36 and 37 are used to separate out this component from the output and fed-back currents.

With the control device arranged as illustrated, and assuming that the frequency of the system is determined by the frequency of the primary source as under normal conditions of operation, the phases of the two sets of impressed electrical variations differ by an angle having some value between 0 and 180 electrical degrees.

Since current can flow in the anode-cathode circuit of the device only when there is coincidence of positive potentials impressed on the anode and control electrode; there will be a flow of impulse current in this circuit and accordingly through the regenerative circuit, an impulse occurring once during each cycle of the impressed variations.

This result would occur equally if no uni-directional potential were impressed on the anode by means of the battery 34. However, the use of this battery, if caused to provide a positive potential for the anode which is not greater than the maximum negative potentials of the variations impressed thereon, results in a more efficient operation of the device. Among other effects, it insures greater average width of the curve representing the variation of the impulse current plotted on a time scale of abscissæ and accordingly a greater quantity of control current per impulse.

The character of these impulse currents will be affected, as in the similar case of the battery 34, by the value of the biasing control electrode potential. If this potential is such as corresponds to the lower end of the static control electrode potential-anode current characteristic curve, these currents can flow in the anode-cathode circuit only, so far as affected by the control electrode potential, during positive alternations of impressed alternating potential variations.

If the frequency of the current produced in the system tends to vary from its normal value, the first effect will be a change in the relative phase of the two sets of impressed potential variations. There accordingly will be an interval, of progressively changing length for successive cycles, during which both the anode and control electrode will have positive potentials impressed upon them. The result will be a progressive change in the impulse current flowing in the regenerative circuit. This tends to prevent the shift of frequency, from that value which is characteristic of the current from the primary source, to a value corresponding to the natural frequency of the regenerative circuit.

As has been pointed out in the statement of invention, there may be any phase relation between the impressed potential variations for normal operation. However, it is preferable to make the phase angle less than 180 electrical degrees to insure a change in control current in either direction from the normal value that is, an increase in one direction and a decrease in the other direction, as the shift occurs in a corresponding direction. The use of this expedient makes possible the extension of the principle to the automatic regulation of the frequency where the change tends to occur in either direction depending on the tuning of the regenerative circuit. If the phase angle for normal operation were 180 degrees there would be a change from zero to a finite value of the control current for a change of relative phase in either direction.

Of course the operation of the basic principles of the invention does not depend on the particular wave generating system disclosed, in which, therefore, the tuned circuit typifies any circuit whatever in which there may occur a change of frequency and which is responsive to changes in current flowing therein to correct the condition which results in the change in frequency.

A rigid mathematical analysis of the control phenomena accompanying this change in impulse current is difficult and, since it is not required in order to enable one to practice the invention, will not be made here.

The following is offered, however, as suggestive of a proper angle of approach for a complete quantitative analysis of the phenomena and as suggestive of certain basic principles involved.

One definite effect of the change of current in the regenerative circuit is a change in the natural frequency of the regenerative circuit. That this is true is evident when it is considered that the resistance of this circuit is an element in the equation expressing the natural period. A change of current in the circuit means a change in the energy losses in the circuit which is equivalent to a change in its resistance and hence in its natural frequency.

This change in tuning is progressive during the time that the frequency of the system tends to vary from the primary frequency and effectively discourages a tendency toward such shift.

Another effect is related to the well-known principle that a synchronously pulsating resistance is the functional equivalent of a reactance and results in the drawing of a reactive component of current. This effect, like the first effect described, is to change the natural frequency of the regenerative circuit.

As to each or both of these effects, the operating cause for the discouragement of the tendency for a shift of frequency results both from the progressive continuous change in the frequency towards which the system tends to shift without regard to the value of that frequency and from the removal of that frequency from the value to which the system most easily tends to shift. For example, if the regenerative circuit were tuned too closely to the primary frequency, a change in its natural frequency to a value comparatively remote from the primary frequency would tend to remove the reason for the shift.

Having set forth the novel principles involved in the invention and described in detail a preferred embodiment thereof, the parts, combinations, methods and apparatus believed to be new and patentable are defined in the following claims:

What is claimed is:

1. In combination an electric discharge device having a cathode and at least two cold electrodes, a source of pulsating potential, means for impressing said pulsating potential on said cathode and one of the cold electrodes, an independent source of pulsating potential, means for impressing said last mentioned pulsating potential on said cathode and another cold electrode, and means for producing between the cathode and one of said cold electrodes current variations, said means including means for changing the phase relation of the pulsating potentials.

2. In combination an electric discharge device having a cathode and at least two cold electrodes, a source of pulsating potential, means for impressing said pulsating potential on said cathode, and one of the cold electrodes, an independent source of pulsating potential, said sources normally generating potentials having the same frequency, means for impressing said second pulsating potential on the cathode, and another cold electrode, and means for producing current variations in the path between the cathode and one cold electrode due to phase displacements between the pulsating potentials.

3. In combination a system to be controlled, a controlling circuit for said system, means for deriving from said system electrical variations whose frequency varies proportionally with the variations in the quantitative measure of a characteristic of said system to be controlled, a source of standard frequency electrical variations, an electric discharge controlling device having a pair of input and a pair of output electrodes, the latter being included in said controlling circuit, and means for impressing said derived and standard frequency electrical variations on an individual pair of said electrodes.

4. In combination a system to be controlled, a controlling circuit for said system, means for deriving from said system electrical variations whose frequency varies proportionally with the variations in the quantitative measure of a characteristic of said system to be controlled, a source of standard frequency electrical variations, an electric discharge controlling device having a pair of input and a pair of output electrodes, the latter being included in said controlling circuit, means for impressing said derived variations on said pair of output electrodes, and means for impressing said standard frequency variations on said pair of input electrodes.

5. In combination an electrical wave generating system comprising a frequency selective circuit, means for deriving from said system electrical variations whose frequency varies with the frequency of the generated wave, a source of standard frequency electrical variations, an electric discharge controlling device having input and output electrodes, the latter being connected to said selective circuit, and means for impressing said derived and standard frequency variations respectively on said output and input electrodes in different relative phases, whereby when the two frequencies tend to differ an impulse current whose period progressively changes from cycle to cycle tends to be superposed on the normal current in said selective circuit.

6. In combination a system to be controlled, a controlling circuit therefor, means for deriving from said system electrical variations whose frequency varies proportionally with the variations in the quantitative measure of a characteristic of said system to be controlled, a source of standard frequency electrical variations, and means comprising a non-distorting electric controlling device responsive conjointly to the variations from said deriving means and from said standard source to cause a correcting current to flow through said controlling circuit when the two frequencies tend to differ.

7. In a system which includes a circuit responsive to a change in current flowing therethrough the method of controlling an electrical characteristic of the system, which comprises generating electrical variations of standard frequency, deriving from said system electrical variations whose frequency varies proportionally with the variations in the quantitative measure of the characteristic to be controlled, and cooperatively using said two sets of variations so that any relative change in phase of said sets of variations is translated into a change of current in said circuit.

8. In combination a regenerative amplifying device including a tuned regenerative circuit, and means responsive to a change of frequency of the current traversing said circuit for preventing said device from becoming self-oscillatory at the natural frequency of the tuned circuit.

9. A regenerative amplifying device including a tuned regenerative circuit, and means for preventing said device from becoming self-oscillatory at the natural frequency of the tuned circuit, said means comprising an electric discharge controlling device having input and output electrodes, means connecting the output electrodes in shunt to a portion of said tuned circuit, and means for impressing on the input electrodes potentials having a frequency different from that to which said tuned circuit is tuned.

10. The combination specified in claim 9 in which the means for impressing potentials on the input electrodes of the device is also a primary energy source of waves to be amplified by said regenerative amplifying device.

11. In combination, a primary energy source, a generator-amplifier connected thereto including a tuned regenerative circuit, and means for preventing said system from oscillating at a frequency determined by the natural frequency of said circuit comprising an electric discharge controlling device having input and output electrodes, means connecting the output electrodes in shunt to a portion of said tuned circuit, and means for impressing on the input electrodes potential variations generated by said primary source.

In witness whereof, I hereunto subscribe my name this 15th day of November, A. D., 1924.

EDMUND R. MORTON.